(12) United States Patent
Song et al.

(10) Patent No.: US 11,949,340 B2
(45) Date of Patent: Apr. 2, 2024

(54) CONVERSION DEVICE AND CONTROL METHOD THEREOF FOR CONTROLLING A PEAK VALUE OF A CURRENT OF A PRIMARY SIDE SWITCH

(71) Applicant: DELTA ELECTRONICS, INC., Taoyuan (TW)

(72) Inventors: Hai-Bin Song, Taoyuan (TW); Qi Fu, Taoyuan (TW); Jian Zhou, Taoyuan (TW); Dao-Fei Xu, Taoyuan (TW); Jin-Fa Zhang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 519 days.

(21) Appl. No.: 16/953,368

(22) Filed: Nov. 20, 2020

(65) Prior Publication Data

US 2021/0075327 A1    Mar. 11, 2021

Related U.S. Application Data

(63) Continuation of application No. 16/278,742, filed on Feb. 19, 2019, now Pat. No. 10,879,807.

(30) Foreign Application Priority Data

Mar. 9, 2018 (CN) .......................... 201810194212.6

(51) Int. Cl.
*H02M 3/335* (2006.01)
*H02M 1/00* (2006.01)
*H02M 3/00* (2006.01)

(52) U.S. Cl.
CPC ... *H02M 3/33576* (2013.01); *H02M 3/33507* (2013.01); *H02M 1/0032* (2021.05); *H02M 3/01* (2021.05)

(58) Field of Classification Search
CPC ............ H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515;
(Continued)

(56) References Cited

U.S. PATENT DOCUMENTS 10,141,830 B1 * 11/2018 Chung .................. H05B 45/10
10,778,103 B2 * 9/2020 Radic .................. H02M 1/0025
(Continued)

FOREIGN PATENT DOCUMENTS

GB        2448741     *  4/2007

*Primary Examiner* — Thienvu V Tran
*Assistant Examiner* — Nusrat Quddus
(74) *Attorney, Agent, or Firm* — CKC & Partners Co., LLC (57) ABSTRACT

A conversion device includes a primary side circuit, a secondary side circuit, a transformer, and a control circuit. The primary side circuit includes a primary side switch and is configured to receive an input voltage. The secondary side circuit outputs an output voltage to a load. The transformer comprises a primary winding and a secondary winding, the primary winding is electrically coupled to the primary side circuit and the secondary winding electrically coupled to the secondary side circuit. The control circuit is configured to control a peak value of the current of the primary side switch, to be limited in a band range.

18 Claims, 9 Drawing Sheets

(58) Field of Classification Search
CPC ......... H02M 3/33576; H02M 3/33592; H02M 3/33553; H02M 3/33523; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 3/073; H02M 2003/071; H02M 2003/072; H02M 2003/075; H02M 2003/076; H02M 2003/077; H02M 2003/078; H02M 2001/0048; Y02B 70/1491; H02J 3/46; H02J 3/38

See application file for complete search history.

(56) References Cited

U.S. PATENT DOCUMENTS

| | | | | |
|---|---|---|---|---|
| 11,183,937 | B2* | 11/2021 | Radic | H02M 1/0022 |
| 11,228,240 | B2* | 1/2022 | Su | H02M 3/01 |
| 2005/0078492 | A1* | 4/2005 | Takahashi | H02M 3/33523 363/21.15 |
| 2006/0055433 | A1* | 3/2006 | Yang | H02M 3/33507 327/10 |
| 2007/0121349 | A1* | 5/2007 | Mednik | H02M 3/33523 363/21.01 |
| 2010/0110732 | A1* | 5/2010 | Moyer | H02M 3/33592 363/19 |
| 2010/0157629 | A1* | 6/2010 | Yoshikawa | H02M 3/33523 363/21.01 |
| 2011/0051470 | A1* | 3/2011 | Li | H02M 3/33515 363/21.15 |
| 2013/0070379 | A1* | 3/2013 | Pan | H02H 3/093 361/87 |
| 2014/0177289 | A1* | 6/2014 | Chen | H02M 3/33515 363/21.13 |
| 2014/0218976 | A1* | 8/2014 | Luo | H02M 1/08 363/21.01 |
| 2014/0268918 | A1* | 9/2014 | Gong | H02M 3/33523 363/21.15 |
| 2016/0268907 | A1* | 9/2016 | Chen | H02M 3/33507 |
| 2016/0276936 | A1* | 9/2016 | Gritti | H02M 1/4258 |
| 2016/0308447 | A1* | 10/2016 | Chen | H02M 3/33523 |
| 2017/0264206 | A1* | 9/2017 | Rana | H02M 1/083 |
| 2018/0262096 | A1* | 9/2018 | Hsu | H02M 3/33507 |
| 2018/0337607 | A1* | 11/2018 | Drda | H02M 1/08 |
| 2018/0351464 | A1* | 12/2018 | Finkel | H02M 3/33507 |
| 2019/0199222 | A1* | 6/2019 | Lin | H02M 3/33507 |
| 2021/0242789 | A1* | 8/2021 | Su | H02M 1/0025 |

\* cited by examiner

CONVERSION DEVICE AND CONTROL METHOD THEREOF FOR CONTROLLING A PEAK VALUE OF A CURRENT OF A PRIMARY SIDE SWITCH

RELATED APPLICATIONS

The present application is a Continuation Application of the U.S. application Ser. No. 16/278,742, filed Feb. 19, 2019, which claims priority to China Application Serial Number 201810194212.6, filed Mar. 9, 2018, which is herein incorporated by reference.

BACKGROUND

Technical Field

The present disclosure relates to a conversion device, and in particular, to a flyback converter.

Description of Related Art

Flyback converter has been widely used in low power applications, especially in power supply below 100 W, because of its simple circuit structure and low cost, etc.

Wherein, the flyback converter with quasi-resonant (QR) operation mode is quite popular because it can achieve valley turning on of the primary side switch which helps to reduce switching loss. However, the switching frequency of the QR flyback increases as the output power decreases, which is disadvantageous to the efficiency of the light load condition.

Therefore, a frequency foldback method has been developed to decrease the switching frequency at light load condition. With the frequency foldback method, the switching frequency decreases with decreasing of the load, but the peak value of the current also decreases with decreasing of the load which limits the decreasing speed of the switching frequency at light load condition. With the development of the high-frequency switching power supply, this problem has become more and more critical.

SUMMARY

One aspect of the present disclosure is provided a conversion device. The conversion device includes a primary side circuit, a secondary side circuit, a transformer, and a control circuit. The primary side circuit includes a primary side switch. The primary side circuit is configured to receive an input voltage, and the secondary side circuit is configured to output an output voltage to a load. The transformer comprises a primary winding and a secondary winding, and the primary winding is electrically coupled to the primary side circuit and the secondary winding is electrically coupled to the secondary side circuit. The control circuit is configured to control a peak value of a current of the primary side switch to be limited in a band range; wherein when the peak value of the current of the primary side switch is beyond the band range, the control circuit adjusts a blanking time of the primary side switch; when the peak value of the current of the primary side switch is larger than an upper limit value of the band range, the control circuit decreases the blanking time; when the peak value of the current of the primary side switch is smaller than a lower limit value of the band range, the control circuit increases the blanking time.

Another aspect of the present disclosure is a control method for a conversion device, includes the following operations: receiving an input voltage from a primary side circuit and outputting an output voltage to a load through a secondary side circuit; and controlling a peak value of a current flowing through a primary side switch to be limited in a band range; adjusting a blanking time of the primary side switch when the peak value of the current of the primary side switch is beyond the band range; wherein, decreasing the blanking time by the control circuit when the peak value of the current of the primary side switch is larger than an upper limit value of the band range; and increasing the blanking time by the control circuit when the peak value of the current of the primary side switch is smaller than a lower limit value of the band range.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or similar parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items. In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
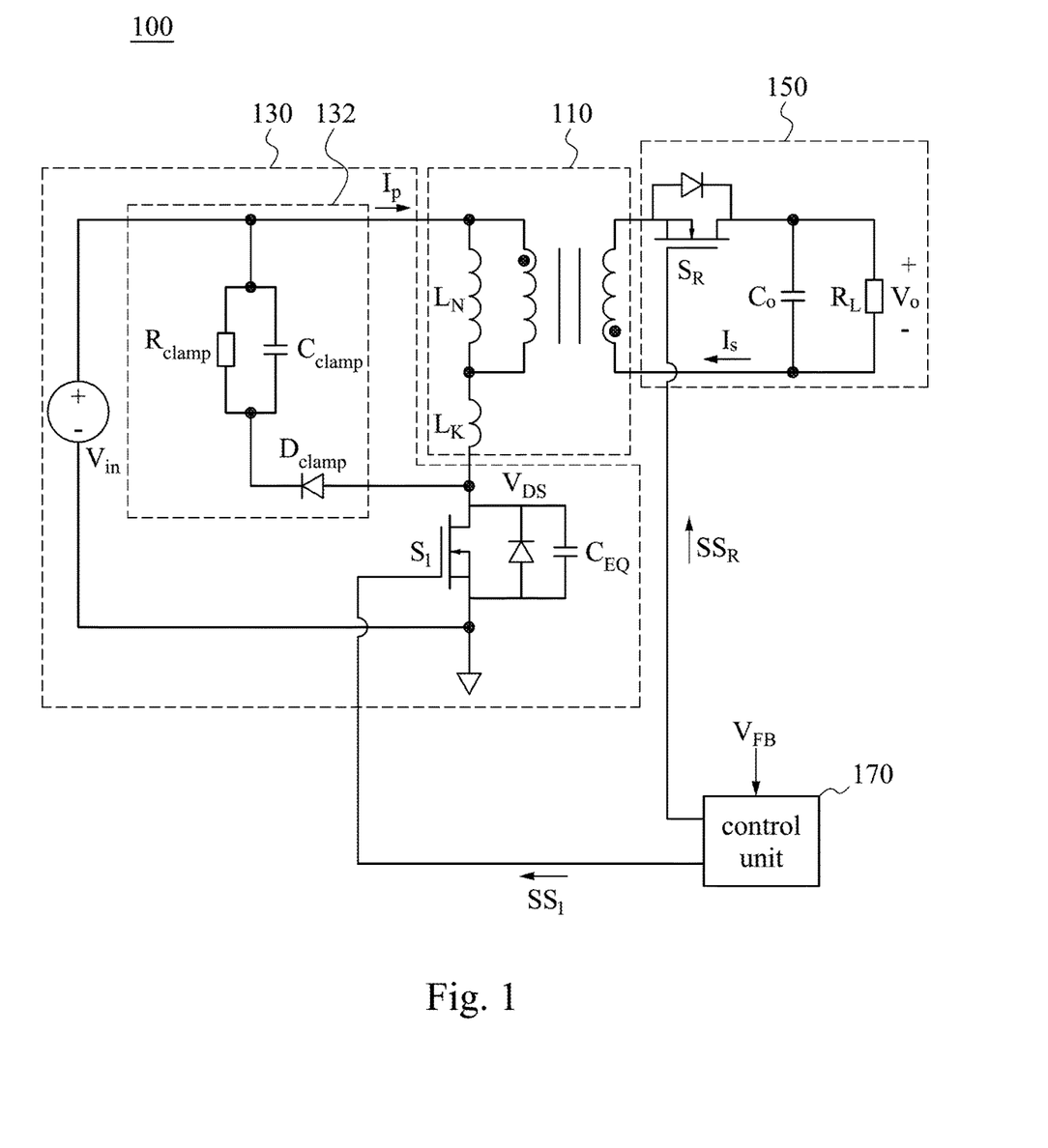
FIG. 1 is a diagram illustrating a conversion device according to some embodiments of the present disclosure.

With reference to FIG. 1, a diagram illustrates a conversion device 100 according to some embodiments of the present disclosure. Wherein, the conversion device 100 is configured to convert the input voltage $V_{in}$ received from the input voltage source to output voltage $V_o$ and output the output voltage $V_o$ to load $R_L$. In some embodiments, conversion device 100 may be a flyback converter, specifically, in some other embodiments, the conversion device 100 may be an active clamp flyback converter, but the present disclosure is not limited thereto.

As illustrated in FIG. 1, the conversion device 100 includes a transformer 110, a primary side circuit 130, a secondary side circuit 150 and a control circuit 170. The transformer 110 includes a primary winding and a secondary winding. The primary winding is electrically coupled to the primary side circuit 130, and the secondary winding is electrically coupled to the secondary side circuit 150. The primary side circuit 130 includes an input power source, a clamp circuit 132 and a primary side switch $S_1$. The secondary side circuit 150 includes a secondary side switch $S_R$, a capacitor $C_o$ and a load $R_L$. The clamp circuit 132 further includes a clamp resistor $R_{clamp}$, a clamp capacitor $C_{clamp}$, and a diode $D_{clamp}$.

As shown in FIG. 1, a first side of the primary winding is electrically coupled to a first side of the input power source; a second side of the primary winding is electrically coupled to the ground terminal and a second side of the input power source through the primary side switch $S_1$. The first side of the secondary winding is electrically coupled to a first side of the capacitor $C_o$ through the secondary side switch $S_R$, the second side of the secondary winding is electrically coupled to the second terminal of the capacitor $C_o$. The transformer 110 is configured to transmit the received electrical energy from the primary winding to the secondary winding. In conjunction with the cooperative operation of circuit elements such as the primary side switch $S_1$ and the secondary side switch $S_R$, the input voltage $V_{in}$ is converted to the output voltage $V_o$ to output to the load $R_L$. Wherein, the conversion device 100 illustrated in FIG. 1 is only one of many possible implementations of the present disclosure, but the present disclosure is not limited thereto.

The output power of the conversion device 100 with quasi-resonant control or frequency foldback control is calculated by the following formula:

$$P_o = \frac{1}{2} L_m I_{pk}^2 f_s \quad (1)$$

Wherein $P_o$ is the output power; $L_m$ represents the inductance value of the transformer 110; $I_{pk}$ is the peak value of the current flowing through the primary side switch $S_1$; $f_s$ is the switching frequency of the primary side switch $S_1$.

Referring to the formula above, if the peak value of the current $I_{pk}$ is fixed, the switching frequency $f_s$ decreases proportionally to the output power $P_o$. When the peak value of the current $I_{pk}$ maintains a maximum value which is limited by the transformer 110, the control method may achieve the best frequency decreasing at light load condition. Wherein, the fixed peak value of the current represents that the on time $t_{on}$ of the primary side circuit 130 is fixed, so this control method is also called a fixed on-time control method.

However, if the peak value of the current $I_{pk}$ is fixed, the switching frequency $f_s$ is continuously adjustable with the output power $P_o$, so it may not be guaranteed that the primary side switch S1 can be turned on at the valley for any output power condition, which will result in inefficiency in some cases when the primary side switch is not turned on at the valley.

In order to turn on the primary side switch at the valley at any output power $P_o$, the peak value of the current $I_{pk}$ needs to be changed from fixing at a certain value to fixing within a band range. Wherein, the band range has an upper limit value and a lower limit value. When the peak value of the current $I_{pk}$ is fixed within a band range, the conduction time of the primary side switch $S_1$ is correspondingly limited within a range and is approximately fixed. This control method is called a quasi-fixed on-time control method.

The conversion device 100 satisfies the following formula:

$$I_{PK} = \frac{V_{in}}{L_m} t_{on} \quad (2)$$

$$I_{PK} = \frac{nV_o}{L_m} t_{off} \quad (3)$$

wherein $I_{pk}$ is the peak value of the current flowing through the primary side switch $S_1$; $L_m$ is the inductance value of the transformer 110; $V_{in}$ represents the input voltage; $t_{on}$ is the on time of the primary side switch $S_1$; n is the ratio of turns of the primary winding and secondary winding of the transformer 110; $V_o$ is the output voltage; $t_{off}$ is the turn on time of the secondary side switch $S_R$.

After the current in the secondary side circuit 150 drops to zero, the drain-source voltage $V_{DS}$ of the primary side switch $S_1$ begin oscillating. The oscillation is caused by the inductor of the transformer 110 and the parasitic capacitors. The period of the oscillation is:

$$T_{r\_ECQ} = 2\pi\sqrt{L_m C_{EQ}} \qquad (4)$$

wherein $T_{r\_ECQ}$ is the resonance period. Lm is the inductance value of the transformer 110. $C_{EQ}$ is the parasitic capacitors value of the primary side switch $S_1$ and the transformer 110.

The method of frequency foldback is based on the quasi-resonant working state, and with the decrease of output power, a blanking time $t_d$ is inserted, so that the conversion device 100 works in discontinuous mode. If the inserted blanking time $t_d$ satisfies the following formula, the primary side switch $S_1$ can be turned on at the valley.

$$t_d(m+\tfrac{1}{2})T_{r\_CEQ} \qquad (5)$$

wherein $t_d$ is the blanking time. m is a non-negative integer, which is the valley ordinal.

The switching frequency $f_s$ of the primary side switch $S_1$ satisfies the following formula:

$$f_s = \frac{1}{t_{on} + t_{off} + t_d} \qquad (6)$$

wherein $t_{on}$ is the conduction time of the primary side switch $S_1$. $t_{off}$ is the conduction time of the secondary side switch $S_R$. $t_d$ is the blanking time.

Figure 2A:
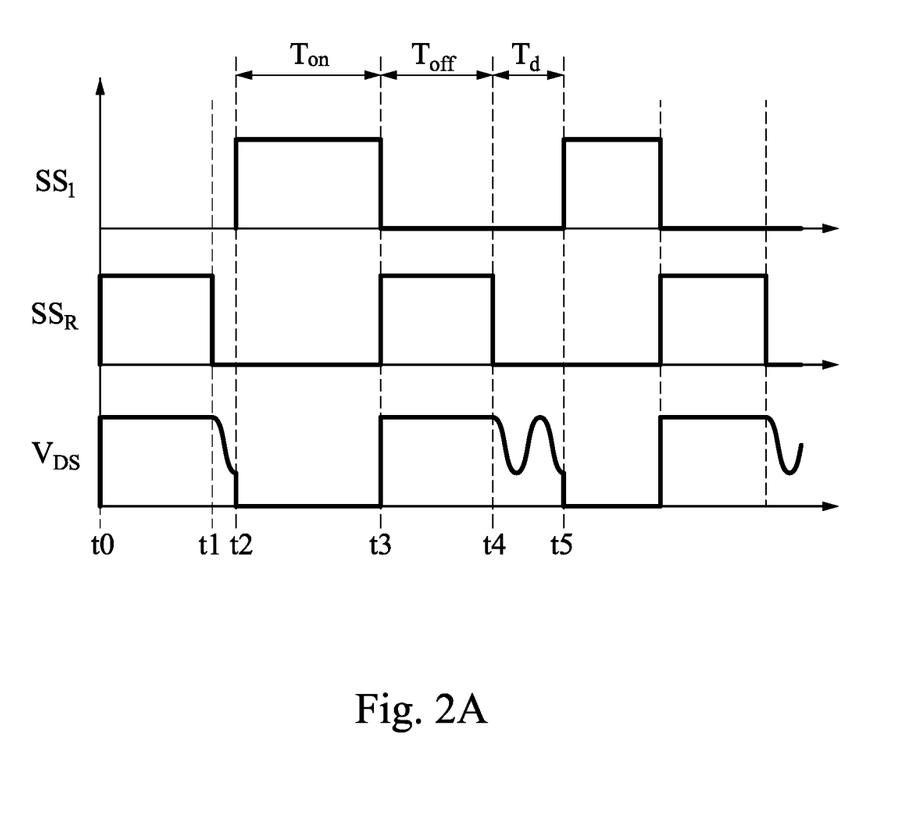
FIG. 2A is a diagram illustrating waveforms of the control signal $SS_1$ and the control signal $SS_R$, and the drain-source voltage Vds1 of the primary side switch of a conversion device according to some embodiments of the present disclosure.

Referring to FIG. 2A, t2 to t3 is the conduction time $t_{on}$ of the primary side switch $S_1$, t3 to t4 is the conduction time $t_{off}$ of the secondary side switch $S_R$, t4 to t5 is blanking time $t_d$. From t4 to t5, the control signal $SS_1$ and the control signal $SS_R$ are controlled at low level, both the primary side switch $S_1$ and the secondary side switch $S_R$ are off, and the drain-source voltage $V_{DS}$ of the primary side switch $S_1$ starts to oscillate. The blanking time $t_d$ may be controlled to be ended at the valley of the resonance, and the primary side switch $S_1$ can be turned on at the valley of the resonance at the same time.

From the above formula (2), (3), (5), (6), the following formula may be obtained:

$$P_o(m, I_{pk}) = \frac{1}{2}L_m I_{pk}^2 \frac{1}{\frac{L_m I_{pk}}{V_{in}} + \frac{L_m I_{pk}}{nV_o} + \left(m+\frac{1}{2}\right)*2\pi\sqrt{L_m C_{EQ}}} \qquad (7)$$

From the above formula (7), for any one output power $P_o$, several groups (m, $I_{pk}$) corresponding to the output power $P_o$ may be found, and the primary side switch $S_1$ can be turned on at the valley with any one of the groups (m, $I_{pk}$).

Further, from the above formula, for any one output power $P_o$, the corresponding different group (m, $I_{pk}$) has the following relationship: the smaller the m, the smaller the $I_{pk}$.

Figure 2B:
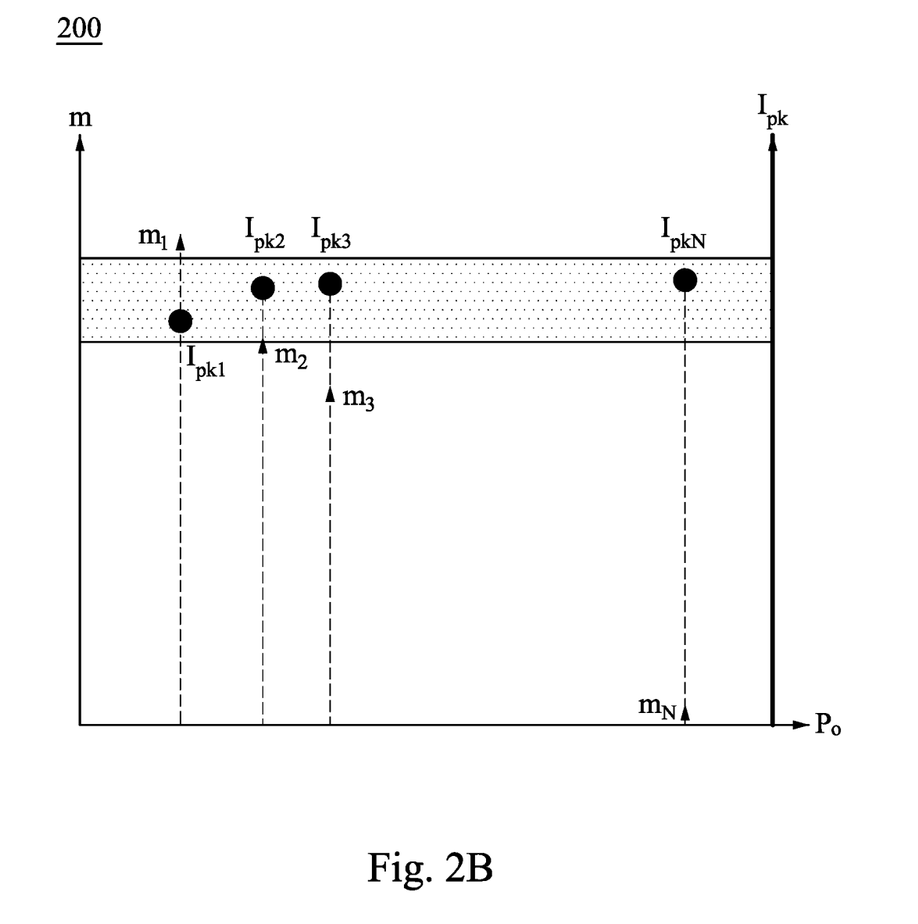
FIG. 2B is a diagram illustrating a relationship of valley ordinal, output power and peak value of the current flowing through the primary side switch according to some embodiments of the present disclosure.

As illustrated in FIG. 2B, for different output power $P_{o1}$, $P_{o2}$, $P_{o3}$, . . . , $P_{oN}$, the corresponding $(m_1, I_{pk1})$, $(m_2, I_{pk2})$, $(m_3, I_{pk3})$ . . . , $(m_N, I_{pkN})$ exists, which makes the peak value of current $I_{pk1}$, $I_{pk2}$, $I_{pk3}$ . . . $I_{pkN}$ relatively close. Therefore, a band range can be set to include $I_{pk1}$, $I_{pk2}$, $I_{pk3}$ . . . $I_{pkN}$. Due to the peak value of the current $I_{pk}$ is limited to the band range, the peak value of the current $I_{pk}$ flowing through the primary side circuit 130 does not decrease with the decreasing of the output power $P_o$, so that a better frequency decreasing at light load condition can be achieved, and the primary side switch can be turned on at the valley.

The valley ordinal m mentioning above does not have to be increased or decreased in consecutive integers, but the adjacent valley ordinal m must satisfy the following formula:

$$\begin{cases} P_o(m_1, A) \le P_o(m_2, B) \\ m_1 < m_2 \end{cases} \qquad (7)$$

wherein $m_1$ and $m_2$ are adjacent integers. A is a lower limit value of the band range, and B is an upper limit value of the band range.

In combination with the formula (1), (2), (3), (6) above, the following formula (8) may be obtained:

$$P_o(m, f_s) = \frac{1}{2}L_m \left(\frac{\frac{1}{f_s} - \left(m+\frac{1}{2}\right)T_{r\_CEQ}}{\frac{L_m}{V_{in}} + \frac{L_m}{nV_o}}\right)^2 f_s \qquad (8)$$

Since the peak value of the current $I_{pk}$ is proportional to a feedback voltage $V_{FB}$, the peak value of current $I_{pk}$ may be controlled in a band range as shown in FIG. 2B by controlling the feedback voltage $V_{FB}$ in a voltage threshold range. In some embodiments, the control circuit 170 obtains the feedback voltage $V_{FB}$ from output voltage $V_o$ of the secondary side circuit 150. The voltage threshold range has a voltage upper limit value $V_{FB\_H}$ and voltage lower limit value $V_{FB\_L}$.

Wherein, the control circuit sets a current setting value according to the feedback voltage $V_{FB}$. When the current Ip of the primary side circuit 130 reaches the current setting value, the control circuit 170 outputs a turn off signal to the primary side switch $S_1$. When the feedback voltage $V_{FB}$ exceeds the voltage threshold range, the control circuit 170 adjusts the blanking time of the primary side switch $S_1$, and an ending signal S_END is outputted according to the blanking time. Further, the control circuit 170 outputs the turn on signal to turn on the primary side switch $S_1$ according to the ending signal S_END and a valley conduction signal S_DET.

In some embodiments, when the feedback voltage $V_{FB}$ is larger than the voltage upper limit value $V_{FB\_H}$ of the voltage threshold range, the control circuit 170 increases the switching frequency $f_s$ of the primary side switch $S_1$. When the feedback voltage $V_{FB}$ is smaller than the voltage lower limit value $V_{FB\_L}$ of the voltage threshold range, the control circuit 170 decreases the switching frequency $f_s$ of the primary side switch $S_1$.

In some embodiments, when the feedback voltage $V_{FB}$ is larger than the voltage upper limit value $V_{FB\_H}$ of the voltage threshold range, the control circuit 170 decreases the blanking time. When the feedback voltage $V_{FB}$ is smaller than the lower limit value $V_{FB\_L}$ of the voltage threshold range, the control circuit 170 increases the blanking time.

Figure 3:
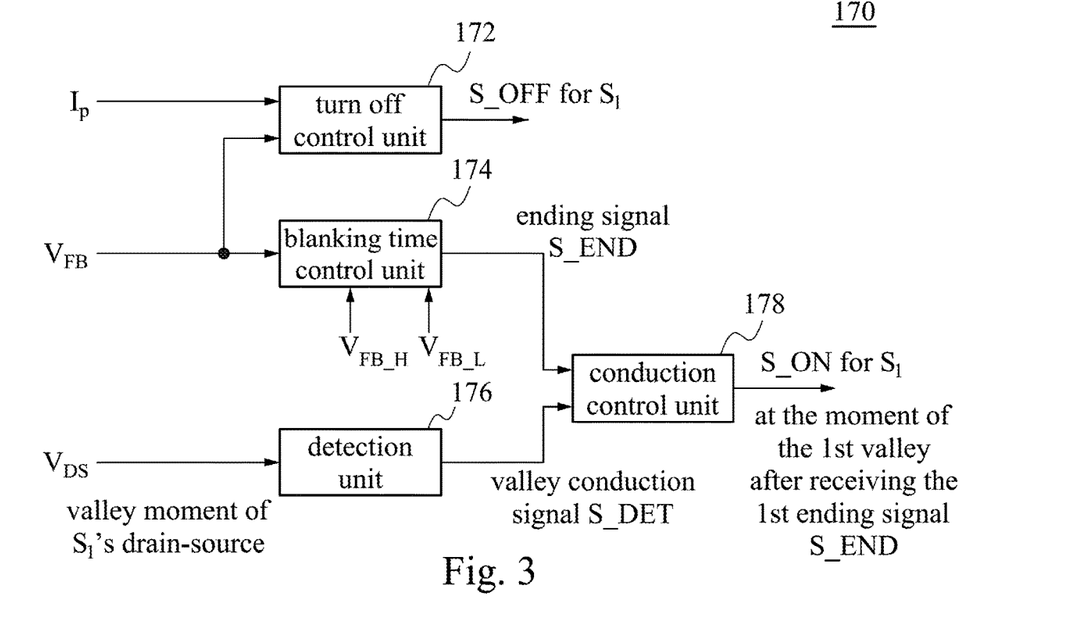
FIG. 3 is a diagram illustrating a control circuit according to some embodiments of the present disclosure.

Referring to FIG. 3, the control circuit 170 includes a turn off control unit 172, a blanking time control unit 174, a detection unit 176 and a conduction control unit 178. The control circuit 170 is for illustrative purposes only, but the present disclosure is not limited thereto.

Referring to FIG. 1 and FIG. 3, the turn off control unit 172 receives the current $I_p$ of the primary side circuit 130. When the current $I_p$ of the primary side circuit 130 is equal to the current setting value corresponding to the feedback voltage $V_{FB}$, the turn off control unit 172 outputs the turn off signal S_OFF to turn off the primary side switch $S_1$.

The blanking time control unit 174 receives the feedback voltage $V_{FB}$, and adjusts the blanking time according to the feedback voltage $V_{FB}$ and the voltage threshold range, and outputs the ending signal S_END according to the blanking time.

Further, the detection unit 176 is configured to detect the valley moment of the drain-source voltage $V_{DS}$ of the primary side switch $S_1$, and transmits a valley conduction signal S_DET to the conduction control unit 178 at a valley moment.

The conduction control unit 178 is configured to output a turn on signal S_ON to the primary side switch $S_1$ according to the ending signal S_END and the valley conduction signal S_DET. In some embodiments, the conduction control unit 178 is further configured to turn on the primary side switch $S_1$ at the moment of the first valley after receiving the ending signal S_END.

Figure 4:
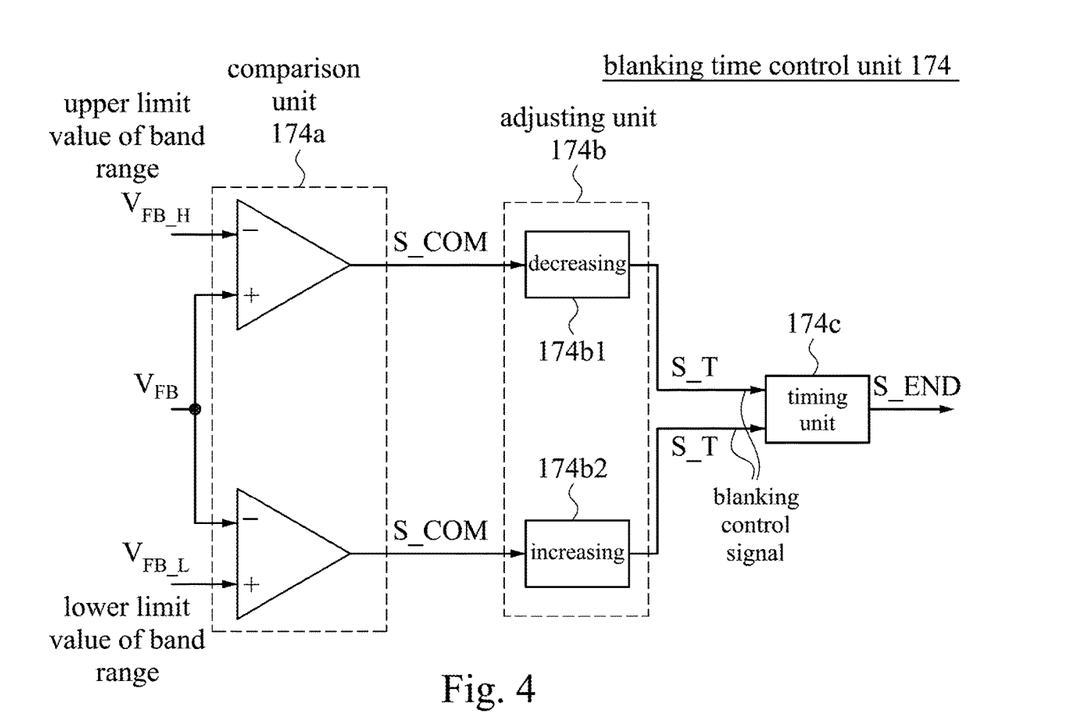
FIG. 4 is a diagram illustrating a blanking time control unit according to some embodiments of the present disclosure.

Referring to FIG. 4, a diagram illustrates a blanking time control unit 174 as shown in FIG. 3 according to some embodiments of the present disclosure. The blanking time control unit 174 includes a comparison unit 174a, an adjusting unit 174b and a timing unit 174c. The adjusting unit 174b further includes a first adjusting unit 174b1 and a second adjusting unit 174b2. The blanking time control unit 174 illustrated in FIG. 4 is for illustrative purposes only, and the present disclosure is not limited thereto.

Further, the comparison unit 174a is configured to determine whether the feedback voltage $V_{FB}$ exceeds the voltage threshold range or not. When the feedback voltage $V_{FB}$ is beyond the voltage threshold range, a comparison signal S_COM is transmitted to the adjusting unit 174b by the comparison unit 174a. The adjusting unit 174b is configured to receive the comparison signal S_COM, adjust the blanking time according to the comparison signal S_COM, and transmit the blanking control signal S_T to the timing unit 174c. The timing unit 174c is configured to control the blanking time according to the blanking control signal S_T and output the ending signal S_END.

In some embodiments, when the feedback voltage $V_{FB}$ is larger than the voltage upper limit value $V_{FB\_H}$ of the voltage threshold range, the first adjusting unit 174b1 decreases a unit time value $\Delta t$ at a time until the feedback voltage $V_{FB}$ enters to the voltage threshold range. When the feedback voltage $V_{FB}$ is smaller than the voltage lower limit value $V_{FB\_L}$ of the voltage threshold range, the second adjusting unit 174b2 increases a unit time value $\Delta t$ at a time to adjust the blanking time until the feedback voltage $V_{FB}$ enters to the voltage threshold range.

In some embodiments, the unit time value is equal to the time between any two valleys. In other words, when the feedback voltage $V_{FB}$ is larger than the voltage upper limit value $V_{FB\_H}$ of the voltage threshold range, the first adjusting unit 174b1 decreases the number of valley to adjust the blanking time. When the feedback voltage $V_{FB}$ is smaller than the voltage lower limit value $V_{FB\_L}$ of the voltage threshold range, the second adjusting unit 174b2 increases the number of valley to adjust the blanking time.

Figure 5:
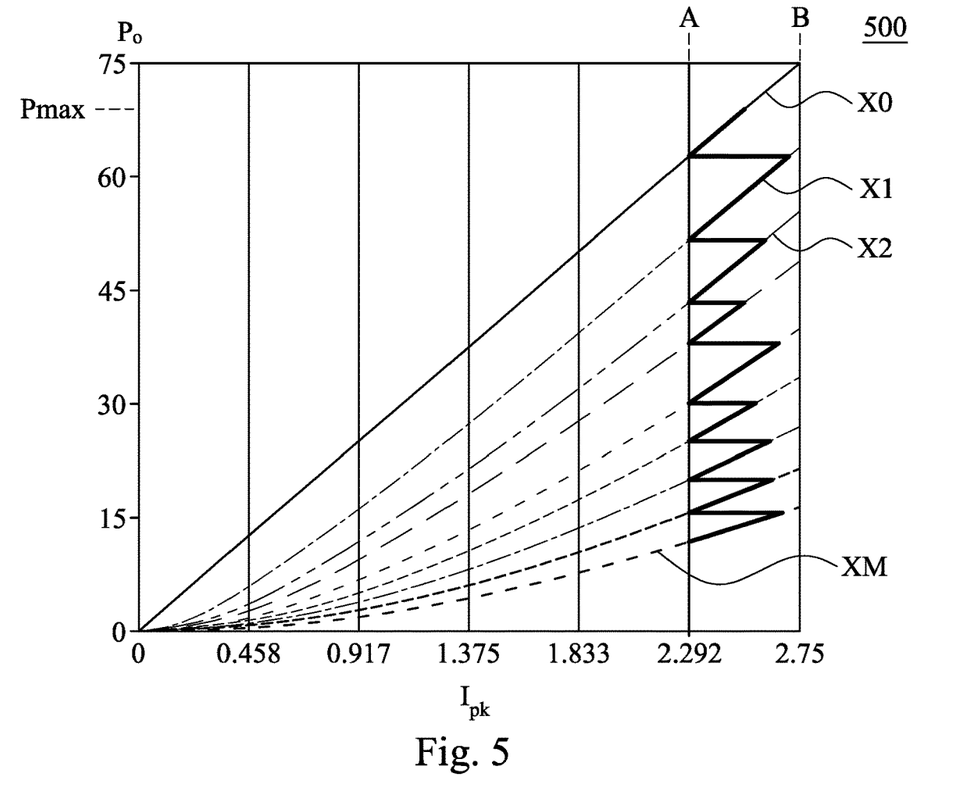
FIG. 5 is a diagram illustrating the relationship between a peak value of the current flowing through the primary side switch and an output power according to some embodiments of the present disclosure.
Figure 7:
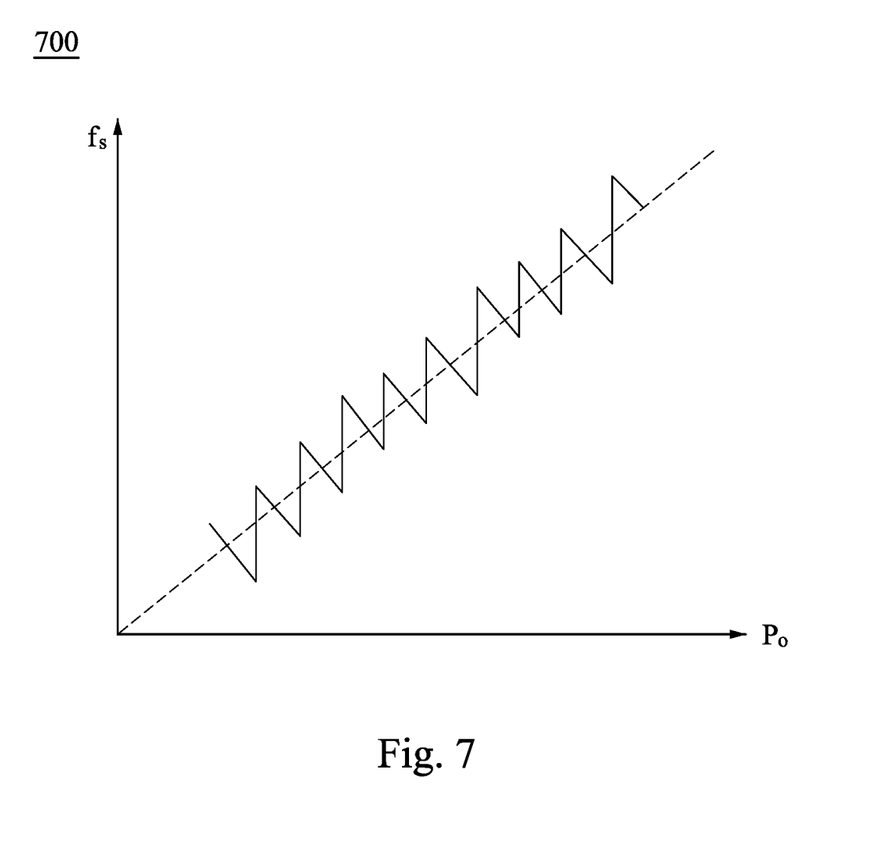
FIG. 7 is a diagram illustrating a relationship between an output power and a switching frequency according to FIG. 5 of the present disclosure.

FIG. 5 is a diagram 500 illustrating the relationship between the peak value of the current $I_{pk}$ and an output power $P_o$ according to some embodiments of the present disclosure. The curves X0 to XM shown in FIG. 5 represent the relationship curve of the peak value of the current $I_{pk}$ versus output power $P_o$ for different values of m. FIG. 7 is a relationship diagram 700 illustrating a relationship between an output power $P_o$ and a switching frequency $f_s$ according to FIG. 5 of the present disclosure.

Figure 6:
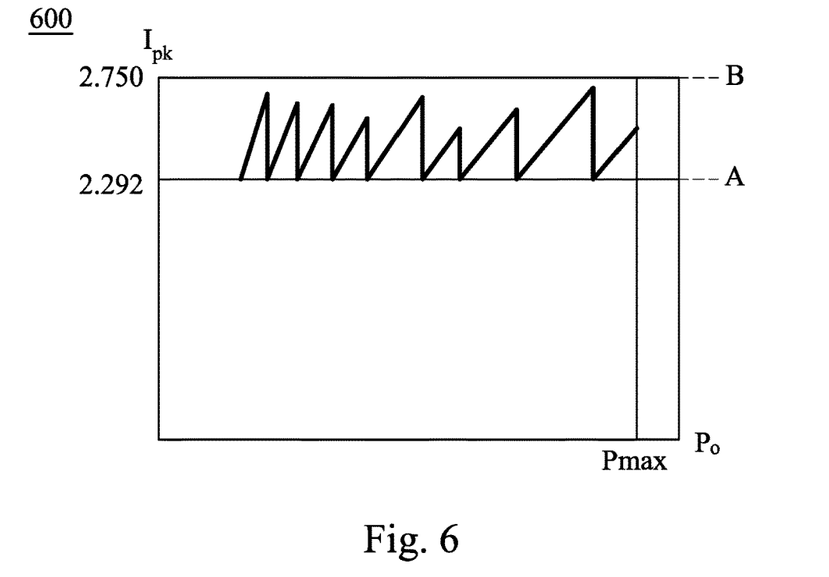
FIG. 6 is a diagram illustrating a relationship between a peak value of the current flowing through the primary side switch and an output power according to FIG. 5 of the present disclosure.

Assume that the current lower limit value $I_{PK\_L}$ corresponding to the voltage lower limit value $V_{FB\_L}$ is 2.292 A, and the current upper limit value $I_{PK\_H}$ corresponding to the voltage upper limit value $V_{FB\_H}$ is 2.75 A. For example, as shown in FIG. 5-7, when the output power $P_o$ starts to decrease from the full load $P_{max}$, at this time, the control circuit 170 sets m=0, which represents that the primary side switch $S_1$ is turned on at the first valley. With the decrease of the output power $P_o$, the primary sides which $S_1$ remains to be turned on at the first valley, and the peak value of the current $I_{pk}$ decreases gradually, and the switching threshold $f_s$ increases gradually. At this time, the relationship curve of the peak value of the current $I_{pk}$ versus the output power $P_o$ is the curve X0.

When the peak value of the current $I_{pk}$ decreases to be lower than the current lower limit value $I_{PK\_L}$ corresponding to the voltage lower limit value $V_{FB\_L}$, the control circuit 170 sets m=1, so the control circuit 170 controls the primary side switch $S_1$ to be turned on at the second valley. At this time, the peak value of the current $I_{pk}$ has a step increase and the switching frequency $f_s$ has a step reduction compared to m=0. Then, with the decrease of the output power $P_o$, the primary side switch $S_1$ remains to be turned on at the second valley. Meanwhile, the peak value of the current $I_{pk}$ gradually decreases and the switching frequency $f_s$ gradually increases with the decrease of the output power $P_o$. As shown in FIG. 5, the relationship curve of the peak value of the current $I_{pk}$ versus the output power $P_o$ is the curve X1.

When the peak value of the current $I_{pk}$ is decreased to be lower than the current lower limit value $I_{PK\_L}$ corresponding to the voltage lower limit value $V_{FB\_L}$ again, the control circuit 170 sets m=2, so the control circuit 170 controls the primary side switch $S_1$ to be turned on at the third valley. At this time, the relationship curve of the peak value of the current $I_{pk}$ versus the output power $P_o$ is the curve X2. And so on, the switching frequency $f_s$ is gradually adjusted, until the switching frequency $f_s$ decreases to a frequency setting value. For example, the control circuit 170 sets m=M, at this time, the relationship curve of the peak value of the current $I_{pk}$ versus the output power $P_o$ is the curve XM.

FIG. 6 is a relationship diagram 600 illustrating a relationship between a peak value of the current $I_{pk}$ and an output power $P_o$ according to FIG. 5 of the present disclosure. As illustrated in FIG. 6, the conversion device 100 in the present disclosure may effectively controls the peak value of the current $I_{pk}$ to be within a band range corresponding to the voltage threshold range.

As illustrated in FIG. 7, the dashed line represents relationship between switching frequency $f_s$ and output power $P_o$ with the fixed on-time control method. The solid line represents relationship between switching frequency $f_s$ and output power $P_o$ in the present disclosure. Wherein, the switching frequency $f_s$ decreases segmentally with the decrease of the output power $P_o$, and fluctuates up and down the dashed line to form a substantially downward trend.

Figure 8:
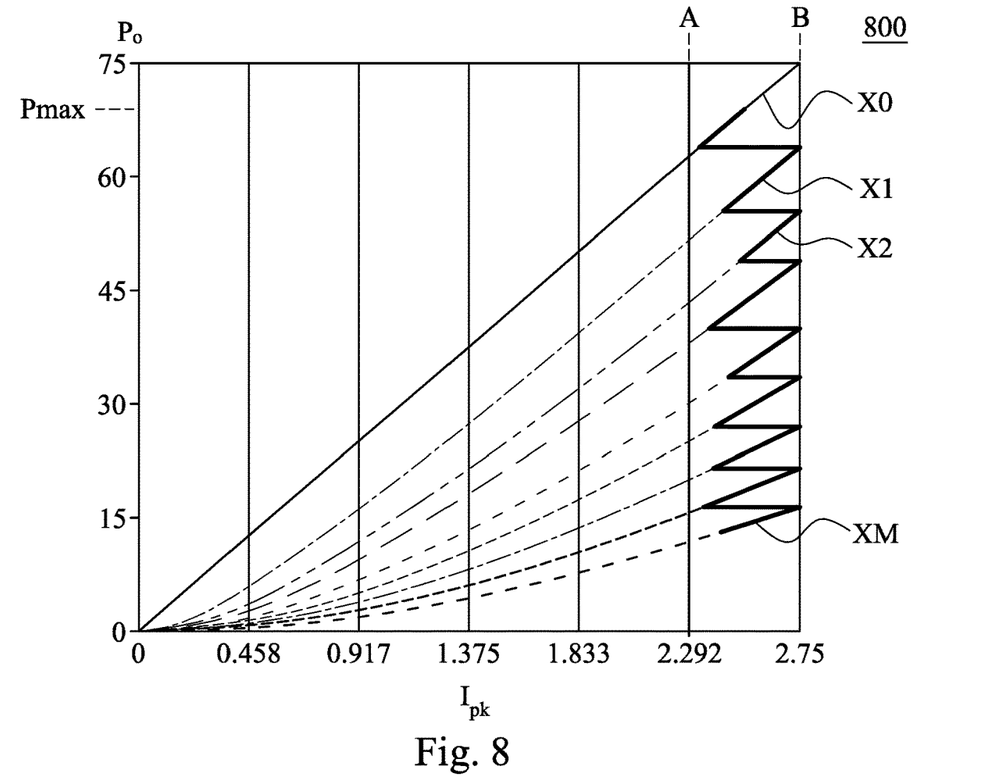
FIG. 8 is a diagram illustrating a relationship between a peak value of the current flowing through the primary side switch and an output power according to some embodiments of the present disclosure.
Figure 10:
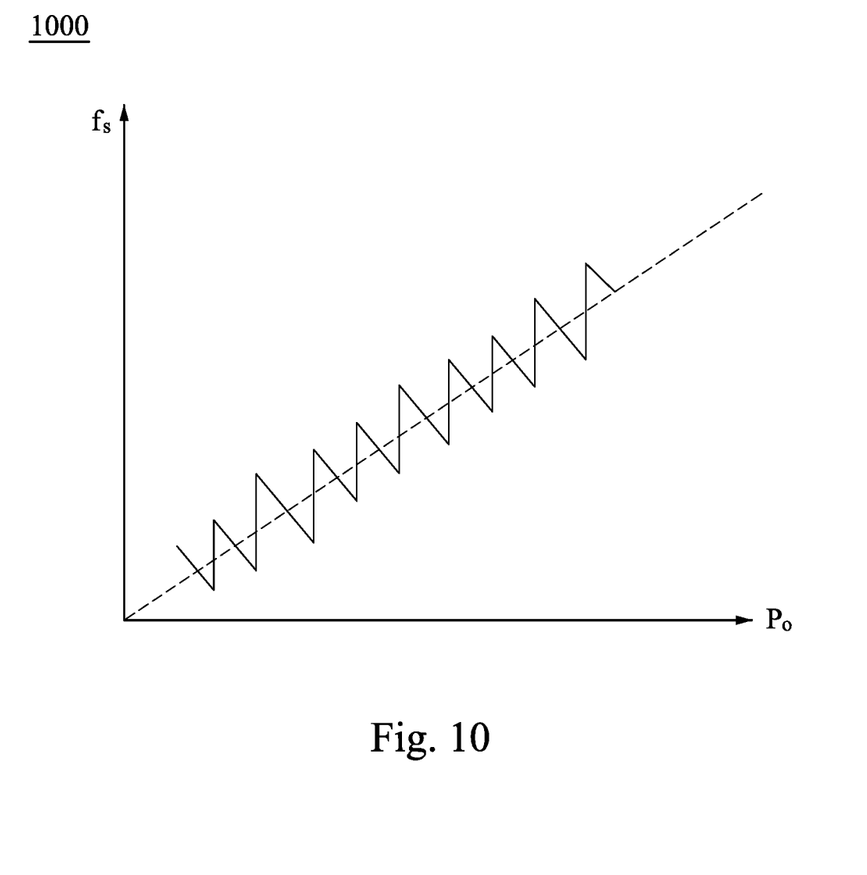
FIG. 10 is a diagram illustrating a relationship between an output power and a switching frequency according to according to FIG. 8 of the present disclosure.

FIG. 8 is a relationship diagram 800 illustrating a relationship between a peak value of the current $I_{pk}$ and an output power $P_o$ according to some embodiments of the present disclosure. The curves X0 to XM shown in FIG. 8 represent the relationship curve of the peak value of the current $I_{pk}$ versus output power $P_o$ for different values of m. FIG. 10 is a diagram 1000 illustrating a relationship between an output power $P_o$ and the switching frequency $f_s$ according to according to FIG. 8 of the present disclosure.

Figure 9:
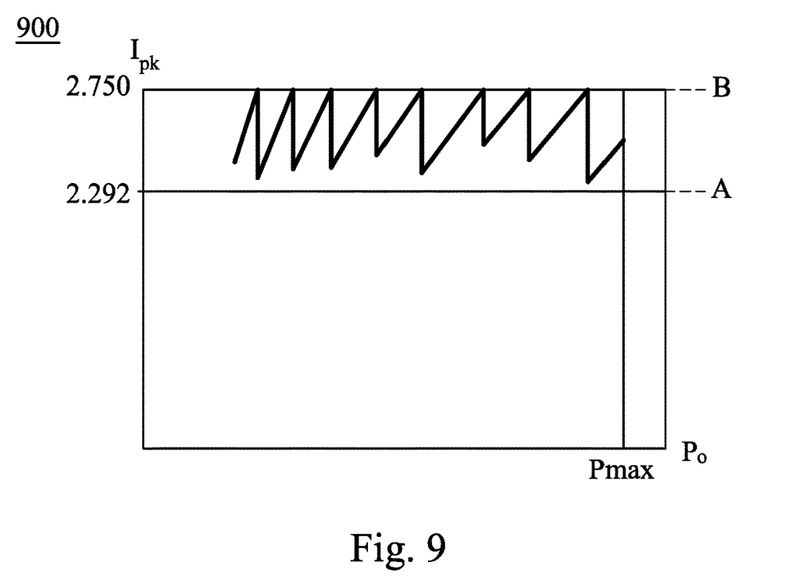
FIG. 9 is a diagram illustrating a relationship between a peak value of the current flowing through the primary side switch and an output power according to according to FIG. 8 of the present disclosure.

Assume that the current lower limit value $I_{PK\_L}$ corresponding to the voltage lower limit value $V_{FB\_L}$ is 2.292 A, and the current upper limit value $I_{PK\_H}$ corresponding to the voltage upper limit value $V_{FB\_H}$ is 2.75 A. As shown in FIG. 8-10, when the output power $P_o$ increases from the light load condition, for example, m=M, which represents that the primary side switch $S_1$ is turned on at the M+1 valley. With the increase of the output power $P_o$, the primary side switch $S_1$ remains to be turned on at the M+1 valley. The peak value of the current $I_{pk}$ increases gradually, and the switching frequency $f_s$ decreases gradually. At this time, the relationship curve of the peak value of the current $I_{pk}$ versus the output power $P_o$ is the curve XM.

When the peak value of the current $I_{pk}$ is increased to be higher than the current upper limit value $I_{PK\_H}$ corresponding to the voltage upper limit value $V_{FB\_H}$, the control circuit 170 sets m=M−1, so the control circuit 170 controls the primary side switch $S_1$ to be turned on at the M valley. At this time, the peak value of the current $I_{pk}$ has a step down and the switching frequency $f_s$ has a step increase compared to m=M. With the increase of the output power $P_o$, the primary side switch $S_1$ remains to be turned on at the M valley, and the peak value of the current $I_{pk}$ increases gradually, and the switching frequency $f_s$ decreases gradually. At this time, the relationship curve of the peak value of the current $I_{pk}$ versus the output power $P_o$ is the curve XM−1.

When the peak value of the current $I_{pk}$ is increased to be higher than the current upper limit value $I_{PK\_H}$ corresponding to the voltage upper limit value $V_{FB\_H}$, the control circuit 170 sets m=M−2, so the primary side switch $S_1$ is turned on at the M−1 valley. At this time, the relationship curve of the peak value of the current $I_{pk}$ versus the output power $P_o$ is the curve XM−2. And so on, the switching frequency $f_s$ is adjusted gradually, for example, the control circuit 170 sets m=0, at this time, the relationship curve of the peak value of the current $I_{pk}$ versus the output power $P_o$ is the curve X0, and the output power $P_o$ reaches the full load $P_{max}$.

FIG. 9 is a diagram 900 illustrating a relationship between a peak value of the current $I_{pk}$ and an output power $P_o$ according to according to FIG. 8 of the present disclosure. As illustrated in FIG. 9, the conversion device 100 in the present disclosure may effectively controls the peak value of the current $I_{pk}$ within a band range corresponding to the voltage threshold range.

As illustrated in FIG. 10, the dashed line represents relationship between switching frequency $f_s$ and output power $P_o$ with the fixed on-time control method. The solid line represents relationship between switching frequency $f_s$ and output power $P_o$ in the present disclosure. The switching frequency $f_s$ increases segmentally with the increase of the output power $P_o$, and fluctuates up and down the dashed line to form a substantially upward trend.

Referring to FIG. 7 and FIG. 10, the present disclosure approximately realizes the linear decrease of the switching frequency $f_s$ with the decrease of the output power $P_o$, a better frequency decreasing at light load condition is achieved, and at the same time, the zero voltage conduction of the primary side switch $S_1$ is guaranteed.

Figure 11:
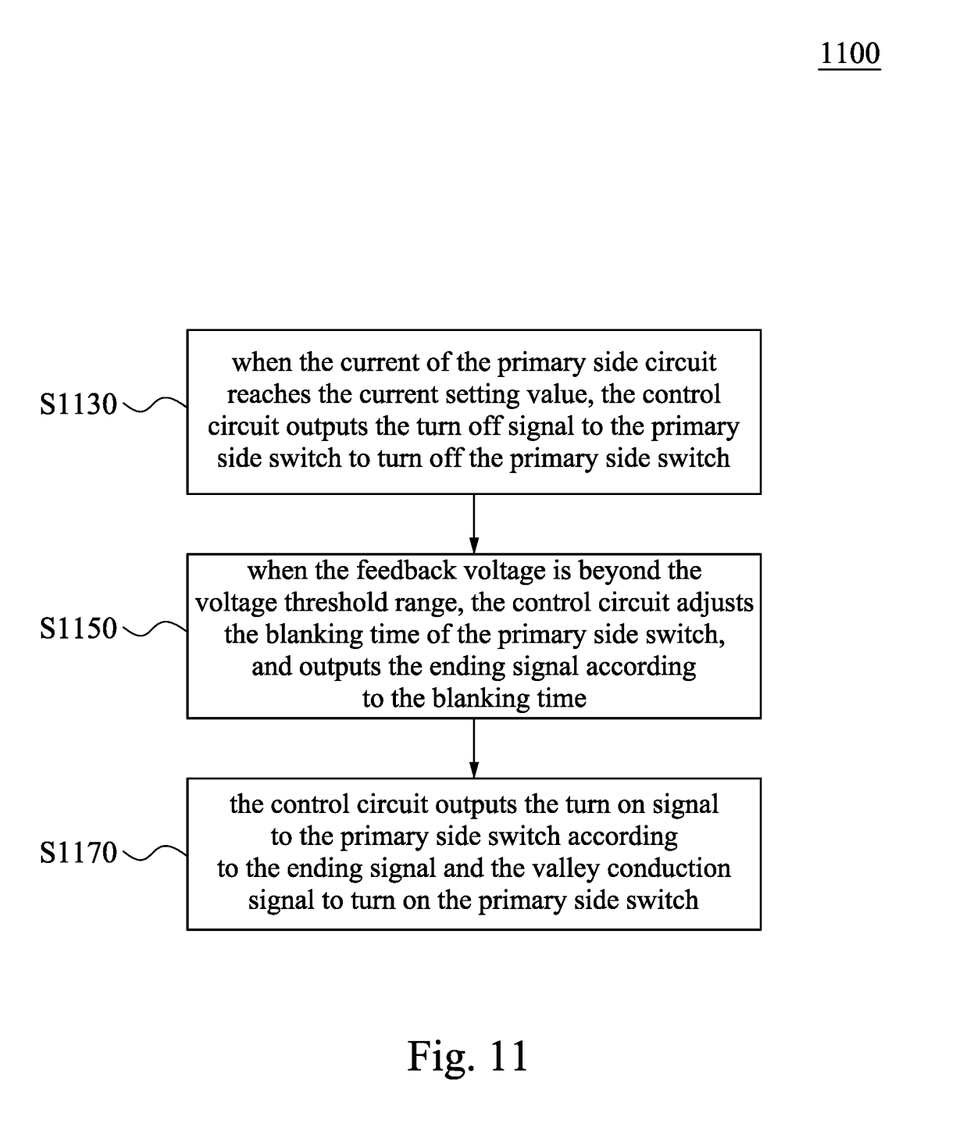
FIG. 11 is a flowchart illustrating a control method according to some embodiments of the present disclosure.

With reference to FIG. 11, a flowchart illustrates a control method 1100 according to some embodiments of the present disclosure. For convenience and clarity, the following control method 1100 is described in coordinate with the examples shown in FIG. 1, FIG. 3, and FIG. 4, but the present disclosure is not limited thereto. Anyone who is familiar with this skill can make various changes and refinements without departing from the spirit and scope of the present disclosure.

As illustrated in FIG. 11, the control method 1100 includes procedures S1130, S1150 and S1170. In operation S1130, when the current $I_p$ of the primary side circuit 130 reaches the current setting value, the control circuit 170 outputs the turn off signal S_OFF to the primary side switch $S_1$ to turn off the primary side switch $S_1$.

In operation S1150, when the feedback voltage $V_{FB}$ is beyond the voltage threshold range, the control circuit 170 adjusts the blanking time of the primary side switch $S_1$, and outputs the ending signal S_END according to the blanking time. In some embodiments, the voltage threshold range includes the voltage upper limit value $V_{FB\_H}$ and the voltage lower limit value $V_{FB\_L}$. For example, when the feedback voltage $V_{FB}$ is larger than the voltage upper limit value $V_{FB\_H}$ of the voltage threshold range, the control circuit 170 decreases the blanking time. When the feedback voltage $V_{FB}$ is smaller than the voltage lower limit value $V_{FB\_L}$ of the voltage threshold range, the control circuit 170 increases the blanking time. Then, the control circuit 170 outputs the ending signal S_END according to the blanking time.

In some other embodiments, when the feedback voltage $V_{FB}$ is larger than the voltage upper limit value $V_{FB\_H}$ of the voltage threshold range, the control circuit 170 increases the switching frequency $f_s$ of the primary side switch $S_1$ to decrease the blanking time. When the feedback voltage $V_{FB}$ is smaller than the voltage lower limit value $V_{FB\_L}$ of the voltage threshold range, the control circuit 170 decreases the switching frequency $f_s$ of the primary side switch $S_1$ to increase the blanking time. Then, the control circuit 170 outputs the ending signal S_END according to the blanking time.

Further, the comparison unit 174a as illustrated in FIG. 4 determines whether the feedback voltage $V_{FB}$ is beyond the voltage threshold range or not, and when the feedback voltage $V_{FB}$ is beyond the voltage threshold range, the comparison unit 174a transmits the comparison signal S_COM to the adjusting unit 174b. The adjusting unit 174b receives the comparison signal S_COM, adjusts the blanking time according to the comparison signal S_COM, and transmits the blanking control signal S_T to the timing unit 174c. The timing unit 174c sets and records the blanking time according to the blanking control signal S_T, and outputs the ending signal S_END.

In operation S1170, the control circuit 170 outputs the turn on signal S_ON to the primary side switch $S_1$ according to the ending signal S_END and the valley conduction signal S_DET to turn on the primary side switch $S_1$. In some embodiments, the conduction control unit 178 as illustrated in FIG. 3 outputs the turn on signal S_ON to the primary side switch $S_1$ according to the ending signal S_END and the valley conduction signal S_DET to turn on the primary side switch $S_1$. For example, the conduction control unit 178 as illustrated in FIG. 3 is further configured to turn on the switch $S_1$ at the first valley occur moment after receiving the ending signal S_END. For another example, if the control circuit 170 controls m=M−1, at this time, the control circuit 170 outputs the turn on signal S_ON to the primary side switch $S_1$ according to the ending signal S_END and the valley conduction signal S_DET, to control the primary side switch $S_1$ to be turned on at the M valley.

In some embodiments, the ending signal S_END is transmitted to the turn on conduction control unit 178 by the blanking time control unit 174. In some embodiments, the detection unit 176 detects the valley moment of the drain-source voltage $V_{DS}$ of the primary side switch $S_1$, and transmits the valley conduction signal S_DET to the conduction control unit 178 at the valley moment.

In summary, in the embodiments of the present disclosure, the primary side switch $S_1$ is turned off when the current $I_p$ of the primary side circuit 130 reaches the current setting value corresponding to the feedback voltage $V_{FB}$, and the switching frequency $f_s$ of the primary side switch $S_1$ is controlled by adjusting the blanking time to limit the peak value of the current $I_{pk}$ within a band range. In the embodiments of the present disclosure, the peak value of the current of the primary side circuit 130 is not required to decrease with the deceasing of the output power $P_o$, and the better frequency decreasing at light load condition can be achieved, and the primary side switch can be tuned on at valley to guarantee efficiency.

Those skilled in the art can immediately understand how to perform the operations and functions of the control method 1100 based on the conversion device 100 in the various embodiments described above, and thus a further explanation is omitted herein for the sake of brevity.

While disclosed methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A conversion device, comprising:
   a primary side circuit, comprising a primary side switch, and configured to receive an input voltage;
   a secondary side circuit, output an output voltage to a load;
   a transformer comprising a primary winding and a secondary winding, and the primary winding electrically coupled to the primary side circuit and the secondary winding electrically coupled to the secondary side circuit; and
   a control circuit configured to control a peak value of a current of the primary side switch, to be limited in a band range;
   wherein when the peak value of the current of the primary side switch is beyond the band range, the control circuit adjusts a blanking time of the primary side switch; when the peak value of the current of the primary side switch is larger than an upper limit value of the band range, the control circuit decreases the blanking time; when the peak value of the current of the primary side switch is smaller than a lower limit value of the band range, the control circuit increases the blanking time.

2. The conversion device of claim 1, wherein when the peak value of the current of the primary side switch reaches a current setting value, the control circuit outputs a turn off signal to turn off the primary side switch;
   and the control circuit generates an ending signal according to the blanking time;
   wherein the control circuit outputs a turn on signal to the primary side switch according to the ending signal and a valley conduction signal to turn on the primary side switch.

3. The conversion device of claim 2, wherein the control circuit further comprises:
   a turn off control unit, when the peak value of the current of the primary side switch reach the current setting value which is determined by a feedback voltage, the turn off control unit outputs the turn off signal to the primary side switch.

4. The conversion device of claim 2, wherein the current setting value is proportional to a feedback voltage, wherein the control circuit further comprises:
   an blanking time control unit, configured to adjust the blanking time according to the feedback voltage and a voltage threshold range, and outputs the ending signal according to the blanking time; and
   a conduction control unit, configured to outputs the turn on signal to the primary side switch according to the ending signal and the valley conduction signal.

5. The conversion device of claim 4, wherein the blanking time control unit further comprises:
   a comparison unit, configured to compare the feedback voltage with the voltage threshold range, and transmits a comparison signal when the feedback voltage is beyond the voltage threshold range;
   an adjusting unit, configured to receive the comparison signal, and adjust the blanking time according to the comparison signal, and transmit a blanking control signal; and
   a timing unit, configured to set and record the blanking time according to the blanking control signal, and outputs the ending signal.

6. The conversion device of claim 2, wherein the control circuit further comprises:
   a detection unit, configured to detect a valley moment of a drain-source voltage of the primary side switch, and transmit the valley conduction signal to a conduction control unit during the valley moment.

7. The conversion device of claim 6, wherein the conduction control unit is further configured to turn on the primary side switch at a first valley moment after receiving the ending signal.

8. The conversion device of claim 5, wherein when the feedback voltage is larger than a voltage upper limit value of the voltage threshold range, the adjusting unit decreases a unit time value at a time until the feedback voltage enters to the voltage threshold range; when the feedback voltage is smaller than a voltage lower limit value of the voltage threshold range, the adjusting unit increases a unit time value at a time until the feedback voltage enters to the voltage threshold range.

9. The conversion device of claim 8, wherein the unit time value is equal to the time between any two valleys.

10. A control method for a conversion device, comprising:
    receiving an input voltage from a primary side circuit and outputting an output voltage to a load through a secondary side circuit; and controlling a peak value of a current of a primary side switch of the primary side circuit to be limited in a band range by a control circuit;

adjusting a blanking time of the primary side switch when the peak value of the current of the primary side switch is beyond the band range; wherein, decreasing the blanking time by the control circuit when the peak value of the current of the primary side switch is larger than an upper limit value of the band range; and increasing the blanking time by the control circuit when the peak value of the current of the primary side switch is smaller than a lower limit value of the band range.

11. The control method of claim 10, further comprising:
outputting a turn off signal to the primary side switch by the control circuit to turn off the primary side switch when the peak value of the current of the primary side switch reaches a current setting value;

and generating an ending signal according to the blanking time by the control circuit; and outputting a turn on signal to the primary side switch by the control circuit according to the ending signal and a valley conduction signal to turn on the primary side switch.

12. The control method of claim 11, further comprising:
outputting the turn off signal to the primary side switch by a turn off control unit to turn off the primary side switch when the peak value of the current of the primary side switch reaches the current setting value which is determined by a feedback voltage.

13. The control method of claim 11, wherein the current setting value is proportional to a feedback voltage, and the control method further comprises:

adjusting the blanking time by a blanking time control unit according to the feedback voltage and a voltage threshold range, and outputting an ending signal to a conduction control unit according to the blanking time; and outputting the turn on signal to the primary side switch by the conduction control unit according to the ending signal and the valley conduction signal to turn on the primary side switch.

14. The control method of claim 13, further comprising:
comparing the feedback voltage with the voltage threshold range by a comparison unit, and transmitting a comparison signal when the feedback voltage is beyond the voltage threshold range;

receiving the comparison signal by an adjusting unit, adjusting the blanking time according to the comparison signal, and outputting a blanking control signal; and setting and recording the blanking time by a timing unit according to the blanking control signal, and outputting the ending signal.

15. The control method of claim 11, further comprising:
detecting a valley moment of a drain-source voltage of the primary side switch by a detection unit, and transmitting the valley conduction signal to a conduction control unit at the valley moment.

16. The control method of claim 15, further comprising:
conducting the primary side switch by the conduction control unit at a first valley moment after receiving an ending signal.

17. The control method of claim 14, further comprising:
decreasing the blanking time by a unit time value at a time by the adjusting unit until the feedback voltage enters to the voltage threshold range when the feedback voltage is larger than a voltage upper limit value of the voltage threshold range; and increasing the blanking time by a unit time value at a time by the adjusting unit until the feedback voltage enters to the voltage threshold range when the feedback voltage is smaller than a voltage lower limit value of the voltage threshold range.

18. The control method of claim 17, wherein the unit time value is equal to the time between any two valleys.

* * * * *